United States Patent [19]

Oshibe et al.

[11] Patent Number: 5,180,760
[45] Date of Patent: Jan. 19, 1993

[54] ANTI-FOGGING RESIN FILM-FORMING COMPOSITION

[75] Inventors: Yoshihiro Oshibe, Aichi; Toshihiro Izumi, Urawa; Hideki Doya, Aichi; Hiroshi Ohmura, Aichi; Yasuhiro Yamamoto, Aichi; Keiji Kumazawa, Aichi, all of Japan

[73] Assignee: Nippon Oil and Fats Company, Limited, Japan

[21] Appl. No.: 758,359

[22] Filed: Sep. 10, 1991

Related U.S. Application Data

[63] Continuation of Ser. No. 536,053, Jul. 2, 1990, abandoned, which is a continuation of Ser. No. 341,709, Apr. 19, 1989, abandoned.

[30] Foreign Application Priority Data

Apr. 28, 1988 [JP] Japan ............................ 63-104233
Dec. 1, 1988 [JP] Japan ............................ 63-305429
Dec. 26, 1988 [JP] Japan ............................ 63-330323

[51] Int. Cl.$^5$ .......................... C09K 3/18; C08L 33/26
[52] U.S. Cl. ................................... 523/169; 524/530; 524/533; 524/535; 525/285; 525/286; 525/294; 525/296
[58] Field of Search .............. 523/169; 524/530, 533, 524/535; 525/285, 286, 294, 296

[56] References Cited

U.S. PATENT DOCUMENTS

| | | | |
|---|---|---|---|
| 2,940,952 | 6/1960 | Miller | 522/4 |
| 3,026,293 | 3/1962 | Caldwell | 525/263 |
| 4,315,081 | 2/1982 | Kobayashi et al. | 525/2 |
| 4,604,425 | 8/1986 | Ohmura et al. | 525/88 |
| 4,698,388 | 10/1987 | Ohmura et al. | 525/88 |

FOREIGN PATENT DOCUMENTS

| | | |
|---|---|---|
| 2476662 | 8/1981 | France . |
| 047754 | 12/1977 | Japan . |
| 098518 | 6/1982 | Japan . |
| 074959 | 5/1983 | Japan . |

OTHER PUBLICATIONS

Chemical Abstracts, vol. 104, No. 22, Jun. 2, 1986, p. 104, Abstract No. 188335f, Columbus, Ohio & JP-A-60 226 535 (Mitsubishi Monsanto Kasei Vinyl K.K.) Nov. 11, 1985.

Chemical Abstracts, vol. 105, No. 22, Dec. 1, 1986, p. 100, Abstract No. 192942q, Columbus, Ohio & JP-A-61 98 746 (Mitsubishi Monsanto Kasei Vinyl K.K.) May 17, 1986.

Chemical Abstracts, vol. 110, No. 12, Mar. 20, 1989, p. 5, Abstract No. 95879v, Columbus, Ohio; H. Ohmura et al.: "Preparation of Block and Graft Copolymers and Their Applications. VI. Synthesis and Applications of Hydrophilic and Hydrophobic Block Copolymers" & Kobunshi Ronbunshu 1988, 45 (11), 857–65.

Primary Examiner—Paul R. Michl
Assistant Examiner—John J. Guarrillo
Attorney, Agent, or Firm—Parkhurst, Wendel & Rossi

[57] ABSTRACT

An anti-fogging resin film-forming composition, comprising a block or graft copolymer and a surfactant, each of which block and graft copolymers consists of a hydrophilic polymer segment and a hydrophobic polymer segment having specifically limited monomer compositions, is disclosed. A coating film formed on a matrix surface from the composition has a durable excellent anti-fogging property and having high adhesion to the matrix surface and high strength.

8 Claims, No Drawings

ANTI-FOGGING RESIN FILM-FORMING COMPOSITION

This is a continuation of application 07/536053 filed Jul. 2, 1990 now abandoned which is a continuation of application 07/341709 filed Apr. 21, 1989 now abandoned.

BACKGROUND OF THE INVENTION

1) Field of the Invention

This invention relates to an anti-fogging resin film-forming composition having a high strength in the resulting coating film and capable of protecting the surface of various materials and giving a permanent anti-fogging property to the polymer material surface.

2) Related Art Statement

Various plastic materials, glasses, transparent ceramics and mirror materials are widely used in various use fields, such as helmet shield, disaster-preventing mask, swimming goggles, mirror surface, lens of spectacles, film for agricultural house, packaging film for foods, window-glass of house, and the like, due to their excellent transparency and mirroring property. However, one of the serious drawbacks of these various materials is that, when they are used in a place kept to a high temperature and a high humidity or in a room kept to a temperature higher than that of the outdoor air, steam is condensed on the surface of these materials in the form of a fine waterdrop, and hence the surface of these materials is fogged.

In order to solve these drawbacks, various methods have been proposed. One of the methods is method (1), wherein a so-called composite film consisting of a polyester film and an anti-fogging film formed thereon or an acetyl cellulose film or the like, whose surface has previously been saponified, is stuck, for example, to a window glass of the building and house, and to a mirror in the bathroom and in the lavatory (Japanese Patent Application Publication No. 60-44,147, No. 60-44,148 and No. 60-44,149, and Japanese Patent Laid-open Specification No. 62-54,733). Further, as other methods, methods wherein a film having an anti-fogging property is formed on the surface of a transparent material. These methods are, for example, method (2), wherein a film consisting mainly of a hydrophilic polymer, such as a polymer of 2-hydroxyethyl methacrylate or polyvinyl alcohol, is formed on the surface of a transparent material (Japanese Patent Laid-open Specification No. 59-217,783 and No. 60-223,885); a method (3), wherein a film is formed on the surface of a transparent material by using a random copolymer consisting predominantly of a hydrophilic polymer segment and containing a small amount of a hydrophobic polymer segment or a combination of the hydrophilic polymer and a surfactant in order to maintain the film strength against water (Japanese Patent Application Publication No. 52-47,754); a method (4), wherein a film of a mixture consisting of a hydrophilic and hydrophobic random copolymer and a surfactant is formed on a transparent material surface (Japanese Patent Laid-open Specification No. 56-62,856 and No. 57 98,518), and the like. Further, as a concrete embodiment, there is known a method, wherein an anti-fogging coating composition is coated on the surface of a polyester film, and then the anti-fogging coating composition is cured for a short time of about 10–180 seconds. As the treating condition in this case, there are known a method (5), wherein a mixture of a coating composition, which consists mainly of a hydrophilic polymer, such as a polymer of 2-hydroxyethyl methacrylate or polyvinyl alcohol, and an ion-hardenable crosslinking agent and occasionally a surfactant, is coated on a polyester film, and the coated polyester film is heat treated to form an anti-fogging coating film on the polyester film (Japanese Patent Laid-open Specification No. 59 15,473), and a method (b), wherein a coating composition consisting mainly of a free-radical reaction-inducing polyfunctional oligomer having polyethylene oxide chains in its molecule or 2-hydroxyethyl methacrylate and containing occasionally a surfactant is coated on a polyester film, and the coated polyester film is irradiated with a radiation or an ultraviolet ray to form an anti-fogging coating film on the polyester film (Japanese Patent Laid-open Specification No. 60-156,731).

However, the above described conventional methods have the following drawbacks. In the conventional method (1), the resulting hydrophilic cellulose film is poor in water resistance, heat resistance and brittle resistance, and wrinkles and bubbles are apt to be formed in the interface between the laminated cellulose film and polyester film, and hence the laminate can not be practically used. The conventional method (2) can form a somewhat satisfactory anti-fogging coating film, but the coating film is apt to be cracked and is poor in the strength, and moreover is poor in the adhesion to the surface of a matrix to be coated and is easily peeled off from the matrix. In the conventional method (3), although the coating film has satisfactorily improved strength and adhesion, the coating film is poor in the anti-fogging property, the improvement of which property is an important object of the present invention. In the conventional method (4), although the coating film has initially a high anti fogging property, but the anti-fogging property decreases with the lapse of time, and moreover the use of the coating composition containing a large amount of the surfactant results in a coating film having low strength and adhesion, and therefore the method (4) is not still satisfactory. The conventional method (5) has a drawback that a coating film concurrently having high anti-fogging property and film strength can not be obtained due to the reason that the anti-fogging treatment of polyester film must be carried out in a short curing time. That is, the lower are the concentration of crosslinkable functional group in the hydrophilic polymer and the concentration of the crosslinking agent, the higher the anti-fogging performance of the resulting coating film is. However, in this case, the resulting coating film has not a fully crosslinked structure due to the short curing time, and hence the coating film is very poor in the strength and adhesion and can not at all be practically used. On the contrary, when the hydrophilic polymer having crosslinkable functional groups in a high concentration is used in order to obtain a coating film having a high strength, the resulting coating film is very poor in the anti-fogging property, and moreover when a surfactant is contained in the coating composition in order to develop an anti-fogging property, the resulting coating film has initially a high anti-fogging property due to the surfactant bled to surface of the coating film, but when the coating film surface is immersed in water, the surfactant bled to the coating film surface is flowed away, and further a surfactant contained in the interior of the coating film can not be bled to the film surface due to the high concentration of the crosslinking agent and hence the anti-fogging property of the coating film is low. The conventional method (6) has a drawback that, although the curing time is short, the curing reaction is apt to proceed rapidly due to the reason that the radical curing reaction is a chain reaction, and therefore the resulting coating film has a very high crosslink density and is poor in the anti-fogging property.

As described above, a satisfactory anti-fogging method for various transparent materials has not yet been found out.

SUMMARY OF THE INVENTION

The object of the present invention is to provide an anti-fogging resin film-forming composition not only having a high initial anti-fogging property, but also having a highly durable anti-fogging property and having an excellent coating property.

The inventors have already proposed, in Japanese Patent Application No. 58-74,959 U.S. Pat. No. 4,604,425, a block copolymer consisting of a hydrophilic polymer segment and a hydrophobic polymer segment, as an anti-fogging composition having a durable wettability and further having a high adhesion to the surface of a matrix to be coated. The inventors have further made various investigations and have found out that, when a block copolymer consisting of a hydrophilic polymer segment and a hydrophobic polymer segment or a graft copolymer consisting of a hydrophilic polymer segment and a hydrophobic polymer segment is mixed with a surfactant, the resulting coating composition can form a coating film on a transparent material, which coating film has such a highly durable wettability that can never been anticipated by the prior technic, and further has a high adhesion to the material surface and a high mar resistance, and can eliminate the drawbacks of conventional technics. As the result, the present invention has been accomplished.

That is, the first aspect of the present invention lies in an anti-fogging resin film-forming composition, comprising a block or graft copolymer, which consists of a hydrophilic polymer segment and a hydrophobic polymer segment, and a surfactant, which hydrophilic polymer segment is formed of 1–40% by weight of at least one of N-substituted or non-substituted (meth)acrylamide-type compounds (in the specification and claims, the term "(meth)acryl" means acryl and methacryl) represented by the following general formula (I) or (II), 1–20% by weight of at least one monomer selected from the group (referred to as Group A) consisting of monomers having a crosslinkable functional group of any one of glycidyl group, N-methylol group, N-methylolether group, carboxyl group and acid anhydride, and 40–98% by weight of at least one of hydrophilic monomers copolymerizable with the above described (meth)acrylamide-type compound and the monomer of the above described Group A, and which hydrophobic polymer segment is formed of 1–40% by weight of at least one monomer selected from the monomers of Group A and 60–99% by weight of at least one hydrophobic monomer copolymerizable with the monomer of Group A, the weight ratio of the hydrophilic polymer segment to the hydrophobic polymer segment being within the range of 50/50–95/5, said general formula (I) being $CH_2=CR_1CONR_2R_3$ wherein $R_1$ and $R_2$ represent hydrogen atoms or methyl groups; and $R_3$ represents hydrogen atom, methyl group, ethyl group, n-propyl group, isopropyl group, N,N-dimethylaminopropyl group or $-C(CH_3)_2CH_2COCH_3$, and said general formula (II) being

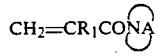

wherein $R_1$ represents hydrogen atom or methyl group; and A represents $-(CH_2)n-$ (wherein n is a positive integer of 4 or 5) or $-(CH_2)_2-O-(CH_2)_2-$.

Further, the inventors have found that, when an anti-fogging resin film-forming composition is formed of a mixture of a block or graft copolymer, which consists of a hydrophilic polymer segment and a hydrophobic polymer segment and has a self-crosslinking property, with a surfactant, a coating film formed from the coating composition has concurrently high anti-fogging property and strength. Particularly, a coating film having both the excellent properties can be formed on a polyester film from the coating composition in a short curing time.

That is, the second aspect of the present invention lies in an anti-fogging resin film-forming composition, comprising a block or graft copolymer and a surfactant, which block or graft copolymer consists of a hydrophilic polymer segment formed of 6–25% by weight of a monomer of glycidyl (meth)acrylate or N-methylolacrylamide, 43–90% by weight of hydroxyalkyl (meth)acrylate, and 4–32% by weight of a monomer selected from the group consisting of acrylamide, N-monomethylacrylamide, N,N-dimethylacrylamide, N-acryloylmorpholine and N-vinylpyrrolidone, and a hydrophobic polymer segment formed of 50–85% by weight of lower alkyl (meth)acrylate and 15–50% by weight of (meth)acrylic acid.

DESCRIPTION OF THE PREFERRED EMBODIMENT

The block copolymer and the graft copolymer, each consisting of a hydrophilic polymer segment and a hydrophobic polymer segment, of the present invention can be produced by various conventional polymerization processes, for example, by the free-radical polymerization process, the cationic ring-opening polymerization process, anionic living polymerization process, and cationic living polymerization process. However, in the present invention, a block copolymer or a graft copolymer is advantageously produced through a free-radical polymerization process with the use of a polymeric peroxide, a polyazo compound or a radically copolymerizable group-containing peroxide as a polymerization initiator in view of the easiness of the commercial production of the copolymer and the various performances of the resulting copolymer. In this case, as the free-radical polymerization initiator, there can be used a commonly known compound having at least 2 peroxy bonds or azo bonds in one molecule, or a compound concurrently having a radically copolymerizable group and a peroxy bond in one molecule, and the block copolymer or the graft copolymer can be easily obtained by an ordinary bulk polymerization process, suspension polymerization process, solution polymerization process or emulsion polymerization process.

A typical method for the production of the block copolymer of the present invention with the use of a polymeric peroxide as a polymerization initiator is as follows. When a hydrophilic polymer-formable vinyl monomer is first polymerized in the presence of a polymeric peroxide, a hydrophilic vinyl polymer containing peroxy bonds introduced into its polymer chain is obtained, and thereafter when the peroxy bond-containing hydrophilic vinyl polymer is polymerized together with a hydrophobic polymer-formable vinyl monomer, the peroxy bond-containing hydrophilic vinyl polymer is cleaved at the peroxy bonds contained therein, and an aimed block copolymer is efficiently obtained. While, a typical method for producing the graft copolymer of the present invention with the use of a radically copolymerizable group-containing peroxide as a polymerization initiator is as follows. When a vinyl monomer, which can be polymerized into a hydrophilic polymer in the presence of an ordinary free-radical polymerization initiator, is first copolymerized in the presence of a radically copolymerizable group-containing peroxide under a condition that the peroxy bonds in the radically copolymerizable group-containing peroxide are not cleaved, a peroxy bond-containing hydrophilic copolymer can be obtained, and thereafter when the resulting peroxy bond-containing hydrophilic copolymer is polymerized together with a hydrophobic polymerformable vinyl monomer under a condition that the peroxy bonds are cleaved, the peroxy bond-containing hydrophilic copolymer is cleaved at the peroxy bonds contained therein, and an aimed graft copolymer is efficiently obtained. In the block copolymer and the graft copolymer obtained by the above described methods, the molecular weights of the hydrophilic polymer segment and hydrophobic polymer segment can be freely adjusted.

Hereinafter, an explanation will be made with respect to the first aspect of the present invention.

In the second aspect of the present invention, an anti-fogging resin film-forming composition is formed of a block or graft copolymer consisting of a hydrophilic polymer segment and a hydrophobic polymer segment, each containing a specifically limited crosslinkable functional group, in combination with a surfactant, whereby a coating film having a high adhesion to the surface of a matrix even under an environment, which causes a thermal history in the coating film, and further having high strength and anti-fogging property is obtained.

The block copolymer to be used in the first aspect of the present invention consists of a hydrophilic polymer segment and a hydrophobic polymer segment, which hydrophilic polymer segment is formed of 1-40% by weight of at least one of N-substituted or non-substituted (meth)acrylamide-type compounds represented by the following general formula (I) or (II), 1-20% by weight of at least one monomer selected from the group (referred to as Group A) consisting of monomers having a crosslinkable functional group of any one of glycidol group, N-methylol group, N-methylolether group, carboxyl group and acid anhydride, and 40-98% by weight of at least one of hydrophilic monomers copolymerizable with the above described (meth)acrylamide-type compound and the monomer of the above described group A, and which hydrophobic polymer segment is formed of 1-40% by weight of at least one monomer selected from the monomers of Group A and 60-99% by weight of at least one hydrophobic monomer copolymerizable with the monomer of Group A, the weight ratio of the hydrophilic polymer segment to the hydrophobic polymer segment being within the range of 50/50-95/5, said general formula (I) being

CH$_2$=CR$_1$CONR$_2$R$_3$ wherein R$_1$ and R$_2$ represent hydrogen atoms or methyl groups; and R$_3$ represents hydrogen atom, methyl group, ethyl group, n-propyl group, isopropyl group, N,N-dimethylaminopropyl group or —C(CH$_3$)$_2$CH$_2$COCH$_3$, and said general formula (II) being

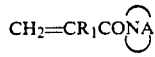

wherein R$_1$ represents hydrogen atom or methyl group; and A represents —(CH$_2$)$_n$— (wherein n is a positive integer of 4 or 5) or —(CH$_2$)$_2$—O—(CH$_2$)$_2$—.

As the N-substituted or non-substituted (meth)acrylamide-type compound to be introduced into the hydrophilic polymer segment constituting one of the molecular chains of the block copolymer to be used in the second aspect of the present invention, there can be used (meth)acrylamide, N-methyl(meth)acrylamide, N,N-dimethyl(meth)acrylamide, N-ethyl(meth)acrylamide, N,N-diethyl(meth)acrylamide, N-N-propyl(meth)acrylamide, N-isopropyl(meth)acrylamide, N,N-dimethylaminopropyl(meth)acrylamide, diacetone(meth)acrylamide, N-(meth) acryloylpyrrolidine, N-(meth)acryloylpiperidine, N-(meth)acryloylmorpholine and the like.

It is necessary that the monomer units of the above described (meth)acrylamide-type compound are contained in the hydrophilic polymer segment in an amount of within the range of 1-40% by weight. When the amount is less than 1% by weight, the resulting coating film is poor in the durability and in the adhesion after thermal history is caused in the film, and when the amount is more than 40% by weight, the resulting coating film is poor in the strength.

As the monomer of Group A, which has a crosslinkable functional group, there can be used glycidyl (meth)acrylate, N-methylol(meth)acrylamide, N-methoxymethylol(meth)acrylamide, N butoxymethylol(meth)acrylamide, (meth)acrylic acid, crotonic acid, itaconic acid, itaconic acid half ester, maleic acid, maleic acid half ester, itaconic anhydride, maleic anhydride and the like.

It is necessary that the monomer units of the above descried monomer of Group A are contained in the hydrophilic polymer segment in an amount of 1-20-% by weight. When the amount of the monomer units of the monomer of Group A is less than 1% by weight, the resulting coating film is unsatisfactory in the strength, and when the amount of the monomer units of the monomer of Group A is more than 20% by weight, the resulting coating film has an extremely high degree of crosslinking and is poor in the anti-fogging property.

As the hydrophilic monomer, which is copolymerizable with the above described (meth) acrylamide-type compound and the above described monomer of Group A having a crosslinkable functional group, there can be advantageously used monomers, which does not at all cause or does not substantially cause a crosslinking reaction with the functional group in the monomer of Group A. These monomers include radically polymerizable unsaturated carboxylic acids, such as (meth)acrylic acid, itaconic acid, crotonic acid and the like, and their alkali metal salt, ammonium salt and organic amine salt; radically polymerizable unsaturated monomers having a sulfonic acid group, such as styrene sulfonic acid, sulfopropyl (meth)acrylate and the like, and their alkali metal salt, ammonium salt and organic amine salt; quaternary ammonium salts derived from (meth)acrylic acid, such as methacryloyloxyethyltrimethylammonium chloride, 2-hydroxy-3-methacryloyloxypropyltrimethylammonium chloride and the like; hydroxy esters of (meth)acrylic acid, such as hydroxyethyl (meth)acrylate, hydroxypropyl (meth)acrylate, 3-chloro-2-hydroxypropyl (meth)acrylate and the like; polyethylene glycol esters or polypropylene glycol esters of (meth)acrylic acid, such as diethylene glycol (meth)acrylate, triethylene glycol (meth)acrylate, dipropylene glycol (meth)acrylate and the like; polyhydric alcohol esters of (meth)acrylic acid, such as (meth)acrylic acid monoglyceride and the like; phosphoric acid salts of (meth)acrylic acid, such as mono(2-hydroxyethyl methacrylate) acid phosphate and the like; betaine-type radically polymerizable unsaturated monomers, such as N-(3-sulfopropyl)-N-methacryloyloxyethyl-N,N-dimethylammonium betaine, 1-(3-sulfopropyl)-2-vinylpyridinium betaine and the like; vinylpyridine and its salts; vinylpyrrolidone; and the like.

It is necessary that the hydrophilic polymer segment of the block copolymer to be used in the first aspect of the present invention contains 40-98% by weight of monomer units of at least one of hydrophilic monomers, which are copolymerizable with the above described (meth)acrylamide-type monomer and the above described monomer of Group A.

It is indispensable that the hydrophobic polymer segment, which constitutes the other polymer chain of the block copolymer of the first aspect of the present invention, is formed of 1-40% by weight of a monomer of Group A and 60-99% by weight of a hydrophobic monomer copolymerizable with the monomer of Group A.

In this case, it is preferable that a monomer which has a high reactivity with the functional group introduced into the hydrophilic polymer segment, is selected from the monomers of Group A. For example, when a glycidyl group is contained in the hydrophilic polymer segment, carboxylic acid group or acid anhydride is preferably introduced into the hydrophobic polymer segment. Reversely, when carboxylic acid group or acid anhydride is contained in the hydrophilic polymer segment, it is preferable that glycidyl group is introduced in the hydrophobic polymer segment. When a functional group having a high self-crosslinking property, such as N-methylol group or N-methylolether group, is contained in the hydrophilic polymer segment, either N-methylol group or N-methylolether group may be introduced into the hydrophobic polymer segment, or carboxylic acid group or acid anhydride may be introduced into the hydrophobic polymer segment.

When less than 1% by weight of the monomer units of a monomer of the above described Group A is contained in the hydrophobic polymer segment, the resulting coating film is short in the strength, and when more than 40% by weight of the monomer units of a monomer of the above described Group A is contained in the hydrophobic polymer segment, the resulting coating film is poor in the adhesion to the surface of a matrix to be coated.

The hydrophobic monomer copolymerizable with the monomer of the above described Group A is properly selected by taking into consideration the adhesion of the resulting coating film with the matrix to be coated. As the hydrophobic monomer copolymerizable with the monomer of Group A, there can be used (meth)acrylates, such as methyl (meth)acrylate, ethyl (meth)acrylate, n-propyl (meth)acrylate, isopropyl (meth)acrylate, n-butyl (meth)acrylate, isobutyl (meth)acrylate, tert.-butyl (meth)acrylate, 2-ethylhexyl (meth)acrylate and the like; aromatic vinyl monomers, such as styrene, vinyltoluene, α-methylstyrene and the like; vinyl carboxylates, such as vinyl formate, vinyl acetate, vinyl propionate and the like; butadiene; vinyl chloride, vinylidene chloride; (meth)acrylonitrile; allyl glycidyl ether; and the like.

In the block copolymer to be used in the anti-fogging resin film-forming composition of the first aspect of the present invention, the hydrophilic polymer segment and the hydrophobic polymer segment have a composition corresponding to the above described mixing ratio of the monomers.

In the block copolymer constituting the anti-fogging resin film-forming composition of the first aspect of the present invention, it is necessary that the weight ratio of the hydrophilic polymer segment to the hydrophobic polymer segment is within the range of 50/50-95/5. When the weight ratio of the hydrophilic polymer segment to the hydrophobic segment is less than 50/50, the affinity of the resulting coating film to the surfactant is poor and the surfactant is easily separated out from the coating film, and the coating film is poor in the durability of anti-fogging property. When the weight ratio of the hydrophobic polymer segment to the hydrophilic polymer segment is less than 5/95, not only the adhesion of the resulting coating film to the surface of the matrix to be coated is poor, but also the coating film is poor in the strength, and hence a coating composition containing a block copolymer having a weight ratio of the hydrophilic polymer segment to the hydrophobic polymer segment outside the above described range of 50/50-95/5 can not be practically used.

The second aspect of the present invention will be explained hereinafter.

In the second aspect of the present invention, an anti-fogging resin film-forming composition is formed of a mixture of a block or graft copolymer, which consists of a hydrophilic polymer segment and a hydrophobic polymer segment and has a self-crosslinking property, with a surfactant, whereby a coating film having both excellent anti-fogging property and high strength is obtained. Particularly, this coating composition has such a merit that a coating film having both the excellent properties can be formed on a polyester film in a short curing time.

The block or graft copolymer having a self-crosslinking property to be used in the second aspect of the present invention consists of a hydrophilic polymer segment and a hydrophobic polymer segment, which hydrophilic polymer segment is formed of 6-25% by weight of a monomer of glycidyl (meth)acrylate or N-methylol acrylamide, 43-90% by weight of hydroxyalkyl (meth)acrylate, and 4-32% by weight of a monomer selected from the group consisting of acrylamide, N-monomethylacrylamide, N,N-dimethylacrylamide, N-acryloylmorpholine and N-vinylpyrrolidone, and which hydrophobic polymer segment is formed of 50-85% by weight of lower alkyl (meth)acrylate and 15-50% by weight of (meth)acrylic acid.

An explanation will be made with respect to the monomers constituting the hydrophilic polymer segment of the block or graft copolymer in the second aspect of the present invention.

Glycidyl (meth)acrylate or N-methylolacrylamide is used as follows. In the case where an anti-fogging resin film-forming composition is applied on a polyester film surface and the composition is heated and cured, when the curing temperature is about 80°–140° C., N-methylolacrylamide is advantageously used, and when the curing temperature is about 120°–230° C., glycidyl (meth)acrylate is advantageously used. This glycidyl (meth)acrylate or N-methylolacrylamide is used in an amount of 6–25% by weight based on the total amount of a monomer mixture for forming the hydrophilic polymer segment.

As the hydroxyalkyl (meth)acrylate, there are used hydroxy-lower alkyl (meth)acrylates and the like, and hydroxyethyl (meth)acrylate is preferably used. This hydroxyalkyl (meth)acrylate is used in an amount of 43–90% by weight based on the total amount of a monomer mixture for forming the hydrophilic polymer segment.

As the monomer selected from the group consisting of acrylamide, N-monomethylacrylamide, N,N-dimethylacrylamide, N-acryloylmorpholine and N-vinylpyrrolidone, there are preferably used N-monomethylacrylamide, N,N-dimethylacrylamide and N-acryloylmorpholine. This monomer is used in an amount of 4–32% by weight based on the total amount of a monomer mixture for forming the hydrophilic polymer segment.

An explanation will be made with respect to the monomers constituting the hydrophobic polymer segment of the block or graft copolymer to be used in the second aspect of the present invention.

As the lower alkyl (meth)acrylate, there can be used methyl (meth)acrylate, ethyl (meth)acrylate, n-propyl (meth)acrylate, isopropyl (meth)acrylate, n-butyl (meth)acrylate, isobutyl (meth)acrylate, tert.-butyl (meth)acrylate and the like. Among them, methyl (meth)acrylate is preferably used. This lower alkyl (meth)acrylate is used in an amount of 50–85% by weight based on the total amount of a monomer mixture for forming the hydrophobic polymer segment.

(Meth)acrylic acid is used in an amount of 15–50% by weight based on the total amount of a monomer mixture for forming the hydrophobic polymer segment.

The above described amount ratio of monomers, which are used for the formation of the hydrophilic polymer segment or for the formation of the hydrophobic polymer segment, should be determined from both the anti-fogging property and the strength of the coating film to be formed on the matrices, such as polyester film and the like, and when the amount ratios of the monomers are outside the above described ranges, a coating film having both the excellent anti-fogging property and high strength can not be obtained.

Since the block or graft copolymer to be used in the second aspect of the present invention has a self-crosslinking property, it is preferable to select monomers such that the functional group to be introduced into the hydrophobic polymer segment has a high reactivity with the functional group introduced into the hydrophilic polymer segment. For example, when glycidyl group is contained in the hydrophilic polymer segment, it is preferable to introduce carboxylic acid group or sulfonic acid group into the hydrophobic polymer segment. Reversely, when carboxylic acid group or sulfonic acid group is contained in the hydrophilic polymer segment, it is preferable to introduce glycidyl group into the hydrophobic polymer segment. Further, when a functional group, such as N-methylol group or the like, having a high self-crosslinking property is contained in the hydrophilic polymer segment, N-methyl group, carboxylic acid group or sulfonic acid group may be contained in the hydrophobic polymer segment.

In the above obtained block copolymer or graft copolymer, the molecular weights of the hydrophilic polymer segment and the hydrophobic polymer segment can be freely adjusted. Further, the graft copolymer may be either a graft copolymer, wherein the backbone is formed of a hydrophilic polymer segment and the superstrate is formed of a hydrophobic polymer segment, or a graft copolymer, wherein the backbone is formed of a hydrophobic polymer segment and the superstrate is formed of a hydrophilic polymer segment. Moreover, in the present invention, a combination use of the block copolymer and the graft copolymer can attain the same effect as that attained by the use of the block copolymer or the graft copolymer alone.

In the block copolymer or graft copolymer to be used in the second aspect of the present invention, the weight ratio of hydrophilic polymer segment/hydrophobic polymer segment is preferably within the range of 1/9–9/1, more preferably within the range of 1/5–5/1. When the amount of the hydrophilic polymer segment is less than 10% by weight, the resulting coating film is poor in the anti-fogging property and further the block copolymer is poor in the compatibility with surfactant, and there is a risk that the surfactant is easily separated out from the resulting coating film and the durability of the coating film is deteriorated. While, when the amount of the hydrophobic polymer segment is less than 10% by weight, there is a risk that the resulting coating film is poor in the adhesion to the matrix surface to be modified, and further the resulting coating film is apt to be poor in the water resistance and mechanical strength. Therefore, a block copolymer and graft copolymer containing less than 10% by weight of hydrophilic polymer segment or hydrophobic polymer segment can not be practically used.

In the present invention, there can be used at least one surfactant selected from ordinarily used surfactants, that is, nonionic surfactant, anionic surfactant, cationic surfactant and amphoteric surfactant. Particularly, nonionic surfactant and anionic surfactant are preferably used in view of the durability of the effect. Further, a combination system of nonionic surfactant and anionic surfactant is more preferably used.

As the nonionic surfactant, there can be used, for example, polyoxyethylene higher alcohol ethers, such as polyoxyethylene stearyl ether, polyoxyethylene lauryl ether, polyoxyethylene oleyl ether and the like; polyoxyethylene alkylaryl ethers, such as polyoxyethyleneoctylphenol, polyoxoyethylenenonylphenol and the like; polyoxyethylene acyl esters, such as polyethylene glycol monostearate and the like; polypropylene glycol ethylene oxide additives; polyoxyethylenesorbitan fatty acid esters, such as polyoxyethylenesorbitan monostearate and the like; phosphates, such as alkyl phosphate, polyoxyethylenealkyl ether phosphate and the like; sugar esters; cellulose ethers; and the like.

As the anionic surfactant, there can be used, for example, fatty acid metal salts, such as sodium oleate, potassium oleate and the like; higher alcohol sulfuric acid esters, such as sodium lauryl sulfate, ammonium lauryl sulfate and the like; alkylbenzenesulfonates and alkylnaphthalenesulfonates, such as sodium dodecylbenzenesulfonate, sodium alkylnaphthalenesulfonate and the like; naphthalenesulfonic acidformaldehyde condensate; dialkyl sulfosuccinate; dialkyl phosphate; polyoxyethylene sulfates, such as sodium polyoxyethylene alkylether sulfate, sodium polyoxyethylene alkylphenylether sulfate and the like; and the like.

As the cationic surfactant, there can be used, for example, ethanolamines; amine salts, such as laurylamine acetate, triethanolaminemonostearate formic acid salt, stearylamide-ethyl-diethylamine acetic acid salt and the like; quaternary ammonium salts, such as lauryltrimethylammonium chloride, stearyltrimethylammonium chloride, dilauryldimethylammonium chloride, distearyldimethylammonium chloride, lauryldimethylbenzylammonium chloride, stearyldimethylbenzylammonium chloride and the like; and the like.

As the amphoteric surfactant, there can be used aliphatic-type amphoteric surfactants, such as dimethylalkyllauryl betaine, dimethylalkylstearyl betaine and the like; sulfonic acid-type amphoteric surfactants, dimethylalkyl sulfobetaine and the like; alkylglycine; and the like.

In the film-forming composition in the present invention, 0.1–20 parts by weight of a surfactant is preferably used based on 100 parts by weight of the block copolymer or the graft copolymer. When the amount of the surfactant is less than 0.1 part by weight, it is difficult to obtain a coating film having a high durability of anti-fogging property aimed in the present invention. While, when the amount of the surfactant is more than 20 parts by weight, there is a risk that the resulting coating film is poor in the water resistance and mechanical strength.

In the present invention, the surfactant can be mixed with the block copolymer or graft copolymer in the following manner. That is, a block copolymer or graft copolymer is first dissolved or dispersed in organic solvent, in a mixture of water and organic solvent or in water, and then a surfactant may be directly added to the solution or dispersion of the copolymer. Alternatively, a surfactant is mixed with vinyl monomers, which are to be formed into a block copolymer or graft copolymer, at the production of the block copolymer or graft copolymer.

In general, the film-forming composition of the present invention is applied on the surface of a transparent matrix or on a mirror-surfaced matrix, and the applied composition is dried at room temperature or under heating to form a coating film on the matrix. As the application method of the film-forming composition, there can be used ordinary application methods, that is, roll coat method, spray method, immersion method, brushing method, spin coat method and the like. As the solvent to be used in this application, there can be used water; alcohols, such as methanol, ethanol, n-propanol, isopropanol, n-butanol, diacetone alcohol and the like; alcohol ethers, such as methyl cellosolve, ethyl cellosolve, butyl cellosolve, methylcarbitol, ethylcarbitol, butylcarbitol and the like; ketones, such as methyl ethyl ketone, methyl isobutyl ketone and the like; esters, such as methyl acetate, ethyl acetate, butyl acetate and the like; aromatic hydrocarbons, such as benzene, toluene, xylene and the like; and amides, such as formamide, dimethylformamide and the like. Among them, alcohols, alcohol ethers and mixed solvents of alcohol and alcohol ether are particularly preferable solvents.

The anti-fogging resin film-forming composition of the present invention can be used in combination with a commonly used curing agent and resin in order to enhance the strength in the resulting coating film. For example, there can be used various amino resins, such as alkoxymethylolmelamine-formamide resin, alkylated benzoguanamine resin, urea resin and the like; isocyanate group-containing resins, such as adduct-type polyisocyanate obtained by reacting tolylene diisocyanate with trimethylolpropane, biuret-type polyisocyanate obtained by reacting trimmers of hexamethylene diisocyanate, various blocked isocyanates and the like; bisphenol A-type epoxy resin; bisphenol F-type epoxy resin; polyepoxy compounds, such as trimethylolpropane polyglycidyl ether, neopentylglycol diglycidyl ether and the like; compounds having at least 2 hydroxyl groups, such as polyethylene glycol, polypropylene glycol and the like; compounds having at least 2 carboxyl groups, such as dodecanedioic acid and the like; and the like. The use amount of the curing agent is preferably 0–30% by weight based on the amount of the block copolymer or graft copolymer. When the amount exceeds 30% by weight, the curing agent influences adversely the effect of the present invention.

Further, the anti-fogging resin film-forming composition can be occasionally mixed with commonly known various additives, such as ultraviolet absorbing agent, leveling agent, various curing catalysts, antioxidant and the like.

The reason why the anti-fogging resin film-forming composition of the present invention has excellent coating performance is not clear, but is probably as follows. When a specifically limited block copolymer or graft copolymer according to the present invention is mixed with a surfactant, the hydrophilic polymer segment in the block copolymer or graft copolymer and the surfactant are attracted with each other, and the surfactant is homogeneously dispersed into the block copolymer or into the graft copolymer. Therefore, in the coating film formed from this homogeneous dispersion, the hydrophilic polymer segment in the block copolymer or graft copolymer acts as an anchor of the surfactant to fix tightly the surfactant in the coating film. When water is adhered on the coating film surface, the surfactant is gradually bled out on the coating film surface from the interior of the coating film, and the anti-fogging performance and the durability of the anti-fogging property of the coating film are remarkably improved due to the synergistic effect of the hydrophilic polymer segment in the block or graft copolymer and the surfactant bled out from the interior of the coating film. While, the hydrophobic polymer segment in the block copolymer or graft copolymer is tightly stuck to the matrix surface to form a coating film having high water resistance, corrosion resistance and high strength.

The anti-fogging resin film-forming composition of the present invention results in a coating film having everlasting excellent anti-fogging property for the matrix surface. Further, the resulting coating film has excellent adhesion to transparent materials, such as various plastic materials, glass, transparent ceramics and the like, and to the surface of various mirror materials, and further has excellent water resistance and mechanical strength. Therefore, the anti-fogging resin film-forming composition of the present invention has completely solved the problems in the conventional various anti-fogging paints.

Accordingly, the anti-fogging resin film-forming composition of the present invention is remarkably effective in the use as anti-fogging agent for various plastic molded materials, mirror for dressing table in toilet room, mirror in bathroom, window glass in building and automobile, curve mirror, light reflector, agricultural film, packing film for foods and the like.

The present invention will be explained in more detail referring to the following examples, comparative examples and reference examples. In the examples, "parts" and "%" are by weight unless otherwise indicated.

REFERENCE EXAMPLES 1-15

(Production of block copolymers)

Into a reactor equipped with a thermometer, a stirrer and a reflux cooler was charged 100 parts of methyl cellosolve, and while introducing nitrogen gas into the reactor and heating the reaction system at 70° C., a mixed solution consisting of

| | |
|---|---|
| methyl cellosolve: | 90 parts |
| a (meth)acrylamide-type compound: | S parts |
| a monomer selected from Group A: | T parts |
| a hydrophilic monomer: | U parts |
| and | |
| $\{CO(CH_2)_4COO(C_2H_4O)_3CO(CH_2)COOO\}_{10}$: | 12 parts | was charged into the reactor in 2 hours, and further a polymerization reaction was effected for 2 hours. Then, a mixed solution consisting of

| | |
|---|---|
| methyl cellosolve: | 60 parts |
| a monomer selected from Group A: | V parts |
| and | |
| a hydrophobic monomer: | W parts | was charged into the reactor in 30 minutes, and further a polymerization reaction was effected at 75° C. for 5 hours. The numerical values of the above described parts of S-W, and the results of polymerization reactions are shown in Tables 1 and 2.

REFERENCE EXAMPLES 16-18

(Production of random copolymers)

Into a reactor equipped with a thermometer, a stirrer and a reflux cooler was charged 150 parts of methyl cellosolve, and while introducing nitrogen gas into the reactor and heating the reaction system at 70° C., a mixed solution consisting of

| | |
|---|---|
| methyl cellosolve: | 100 parts |
| a (meth)acrylamide-type compound: | S parts |
| a monomer selected from Group A: | T parts |
| a hydrophilic monomer: | U parts |
| a monomer selected from group A: | V parts |
| a hydrophobic monomer: | W parts |
| and | |
| $CH_3C(CH_3)_2OOCOC(CH_3)_3$: | 3 parts | was charged into the reactor in 2 hours, and further a copolymerization reaction was effected for 5 hours. The numerical values of the above described parts of S-W, and the results of the polymerization reactions are shown in Table 2.

TABLE 1

| Reference example | | 1 | 2 | 3 | 4 | 5 | 6 | 7 | 8 | 9 |
|---|---|---|---|---|---|---|---|---|---|---|
| S | (1) | 20 | 14 | 5 | 14 | 20 | — | — | — | — |
|   | (2) | — | — | — | — | — | 18 | 12 | 18 | 12 |
|   | (3) | — | — | — | — | — | — | — | — | — |
| T | (4) | 2 | 6 | 8 | — | 4 | 6 | 6 | — | 6 |
|   | (5) | — | — | — | 8 | — | — | — | — | — |
| U | (6) | 28 | 50 | 77 | 48 | 12 | 36 | 62 | 34 | 52 |
|   | (7) | — | — | — | — | 14 | — | — | — | 10 |

TABLE 1-continued

| Reference example | | 1 | 2 | 3 | 4 | 5 | 6 | 7 | 8 | 9 |
|---|---|---|---|---|---|---|---|---|---|---|
| V | (8) | 1 | 3 | 4 | — | 2 | 3 | 3 | — | 3 |
|   | (5) | — | — | — | 8 | — | — | — | 8 | — |
| W | (9) | 49 | 27 | 6 | 22 | 25 | 37 | 17 | 32 | 15 |
|   | (10) | — | — | — | — | 23 | — | — | — | 2 |
| Solid content* | | 30 | 30 | 30 | 30 | 30 | 30 | 30 | 30 | 30 |
| Viscosity** | | 4 | 4 | 5 | 4 | 4 | 4 | 5 | 4 | 5 |

TABLE 2

| Reference example | | 10 | 11 | 12 | 13 | 14 | 15 | 16 | 17 | 18 |
|---|---|---|---|---|---|---|---|---|---|---|
| S | (1) | — | — | 6 | — | — | 14 | 14 | — | — |
|   | (2) | — | — | — | — | — | — | — | 18 | — |
|   | (3) | 28 | 10 | — | 3 | — | — | — | — | 10 |
| T | (4) | 6 | 8 | 4 | — | 6 | — | 6 | 6 | 8 |
|   | (5) | — | — | — | 3 | — | — | — | — | — |
| U | (6) | 36 | 60 | 20 | 9 | 59 | 56 | 50 | 36 | 60 |
|   | (7) | — | 12 | — | — | 5 | — | — | — | 12 |
| V | (8) | 3 | 4 | 2 | — | 3 | — | 3 | 3 | 4 |
|   | (5) | — | — | — | 3 | — | — | — | — | — |
| W | (9) | 27 | 6 | 55 | 82 | 27 | 30 | 27 | 37 | 6 |
|   | (10) | — | — | 13 | — | — | — | — | — | — |
| Solid content* | | 30 | 30 | 30 | 30 | 30 | 30 | 28 | 28 | 28 |
| Viscosity** | | 4 | 5 | 4 | 3 | 4 | 5 | 4 | 4 | 5 |

The marks used in the above described Tables 1 and 2 have the following meanings.
(1): N,N-dimethylacrylamide
(2): N,N-dimethylaminopropylmethacrylamide
(3): acryloylmorpholine
(4): glycidyl methacrylate
(5): N-methylolacrylamide
(6): 2-hydroxyethyl methacrylate
(7): mono(2-hydroxyethyl methacrylate)acid phosphate
(8): acrylic acid
(9): methyl methacrylate
(10): isobutyl methacrylate
* : solid content (% by weight)
** viscosity (P) at 25° C.

EXAMPLES 1-11 AND COMPARATIVE EXAMPLES 1-9

Each of all the polymers produced in Reference examples 1-18 was diluted with methyl cellosolve such that the resulting methyl cellosolve solution contained 20% by weight of the solid of the polymer, and then the methyl cellosolve solution was mixed with a surfactant shown in Tables 3 and 4 to produce an anti-fogging coating composition. Then, the composition was applied on a matrix by means of a bar coater such that the composition would be formed into a film having a thickness of 5 μm after dried, and the coated composition was heated and dried under a condition shown in Tables 6 and 7. Various tests shown in Tables 5-8 of the coated matrix were effected.

TABLE 3

| Example | Polymer (parts) | Surfactant (parts) | Matrix | Curing condition |
|---|---|---|---|---|
| Example 1 | Reference example 7, 100 | (a) 2.0 (c) 3.0 | PC | (1) |
| Example 2 | Reference example 8, 100 | (b) 0.5 (e) 0.3 | PC | (1) |
| Example 3 | Reference example 9, | (c) 0.3 | PC | (1) |

TABLE 3-continued

| Example | Polymer (parts) | Surfactant (parts) | Matrix | Curing condition |
|---|---|---|---|---|
| Example 4 | Reference example 10, 100 | (b) 0.5 (d) 0.3 | AC | (2) |
| Example 5 | Reference example 11, 100 | (c) 4.0 (e) 2.0 | PC | (1) |
| Example 6 | Reference example 12, 100 | (b) 2.0 (f) 1.0 | PC | (1) |
| Example 7 | Reference example 13, 100 | (e) 0.6 | PC | (1) |
| Example 8 | Reference example 14, 100 | (b) 2.0 (c) 2.0 | AC | (2) |
| Example 9 | Reference example 15, 100 | (a) 0.3 (c) 0.3 | PC | (1) |
| Example 10 | Reference example 16, 100 | (b) 1.5 (c) 0.5 | PC | (1) |
| Example 11 | Reference example 17, 100 | (a) 1.0 (d) 0.2 | PC | (1) |

TABLE 4

| Comparative example | Polymer (parts) | Surfactant (parts) | Matrix | Curing condition |
|---|---|---|---|---|
| Comparative example 1 | Reference example 12, 100 | (b) 3.0 (d) 1.0 | PC | (1) |
| Comparative example 2 | Reference example 13, 100 | (a) 2.0 (c) 3.0 | AC | (2) |
| Comparative example 3 | Reference example 14, 100 | (e) 3.0 | PC | (1) |
| Comparative example 4 | Reference example 15, 100 | (b) 1.0 (d) 2.0 | PC | (1) |
| Comparative example 5 | Reference example 16, 100 | (b) 0.5 (c) 3.0 | PC | (1) |
| Comparative example 6 | Reference example 17, 100 | (a) 1.0 (c) 1.0 | PC | (1) |
| Comparative example 7 | Reference example 18, 100 | (a) 0.2 (c) 0.2 | PC | (1) |
| Comparative example 8 | Reference example 2, 100 | — | PC | (1) |
| Comparative example 9 | Reference example 7, 100 | — | PC | (1) |

The marks used in the above Tables 3 and 4 have the following meanings.

Surfactants
(a): Nonion NS-212
(b): polyoxyethylene octylphenyl ether sold by Nippon Oil and Fats Co., Ltd. under the trademark of Nonion HS-210
(c): Newrex R
(d): Rapisol B-80
(e): Cation AB
(f): Anon BF Matrix
PC: polycarbonate
AC: polymethyl methacrylate Curing condition
(1): at 120° C. for 30 minutes
(2): at 80° C. for 60 minutes The physical properties of the coating films obtained under the above described conditions were evaluated and judged by the following evaluation methods. The obtained results are shown in Tables 5-8.

(1) Expiration test

A coating film formed in a constant temperature room kept at 20° C. was breathed upon, and the fogged state of the film was judged by the naked eye.

⊚: Film surface is not at all fogged.

○: Water drops spread instantaneously on the film surface.

Δ: Film surface is somewhat fogged x: Film surface is wholly fogged.

(2) 40° C. Steam test

A coating film formed in a constant temperature kept at 20° C. was exposed to the vapor of warm water kept at 40° C., and a lapse of time until the coating film began to be fogged was measured.

(3) 60° C. Steam test:

A coating film formed in a constant temperature room kept at 20° C. was exposed to the vapor of warm water kept at 60° C., and a lapse of time until the coating film began to be fogged was measured.

(4) Water resistance (anti-fogging property)

After a coating film was immersed in water kept at 30° C. for 24 hours, the coating film was air-dried, and then the dried film was subjected to the above described expiration test.

(5) Adhesion

On the surface of a coating film were formed 100 crosscut pieces, which reached the matrix, by means of a cutter knife, and a cellophane adhesive tape (sold by Nichiban Co., Ltd.) was stuck to the crosscut coating film, and then the crosscut coating film was peeled off from the matrix in a direction perpendicular to the direction of the adhering interface between the film and the matrix. The adhesion of the coating film was expressed by the number of crosscut pieces of the coating film remaining on the matrix surface without peeling off therefrom.

(6) Heat resistance

After a coating film was left to stand for 1,000 hours in an incubator kept at 80° C., the above described adhesion test was effected.

(7) Water resistance (adhesion)

After a coating film was immersed in warm water kept at 70° C. for 200 hours, the coating film was air-dried, and then the dried film was subjected to the above described adhesion test.

(8) Hardness

A pencil scratch test was effected according to JIS K 5400.

○: equal to or harder than the hardness 2H of lead pencil x: softer than the hardness 2H of lead pencil (9) Water resistance (strength of coating film)

After a coating film was immersed in water kept at 30° C. for 24 hours, the appearance of the film was observed and judged by the naked eye.

○: no change in the appearance x: The appearance was somewhat charged.

TABLE 5

| Example | Anti-fogging property | | | Water resistance |
|---|---|---|---|---|
| | Expiration test | 40° C. Steam test | 60° C. Steam test | |
| Example 1 | ⓒ | at least 5 hours | at least 5 hours | Δ |
| Example 2 | ○ | at least 5 hours | at least 5 hours | Δ |
| Example 3 | ○ | at least 5 hours | at least 5 hours | ○ |
| Example 4 | ⓒ | at least 5 hours | at least 5 hours | Δ |
| Example 5 | ⊚ | at least 5 hours | at least 5 hours | Δ |
| Example 6 | ⓒ | at least 5 hours | at least 5 hours | Δ |
| Example 7 | ○ | at least 5 hours | at least 5 hours | ○ |
| Example 8 | ⓒ | at least 5 hours | at least 5 hours | Δ |
| Example 9 | ⊚ | at least 5 hours | at least 5 hours | ○ |
| Example 10 | ⊚ | at least 5 hours | at least 5 hours | Δ |
| Example 11 | ⓒ | at least 5 hours | at least 5 hours | ○ |

TABLE 6

| Example | Adhesion | | | Strength of coating film | |
|---|---|---|---|---|---|
| | Original state | Heat resistance | Water resistance | Hardness | Water resistance |
| Example 1 | (a) | (a) | (a) | ○ | ○ |
| Example 2 | (a) | (a) | (a) | ○ | ○ |
| Example 3 | (a) | (a) | (a) | ○ | ○ |
| Example 4 | (a) | (a) | (a) | ○ | ○ |
| Example 5 | (a) | (a) | (a) | ○ | ○ |
| Example 6 | (a) | (a) | (a) | ○ | ○ |
| Example 7 | (a) | (a) | (a) | ○ | ○ |
| Example 8 | (a) | (a) | (a) | ○ | ○ |
| Example 9 | (a) | (a) | (a) | ○ | ○ |
| Example 10 | (a) | (a) | (a) | ○ | ○ |
| Example 11 | (a) | (a) | (a) | ○ | ○ |

TABLE 7

| Comparative example | Anti-fogging property | | | Water resistance |
|---|---|---|---|---|
| | Expiration test | 40° C. Steam test | 60° C. Steam test | |
| Comparative example 1 | Δ | 3 hours | 3 hours | × |
| Comparative example 2 | Δ | 2 hours | 1 hour | × |
| Comparative example 3 | ⓒ | at least 5 hours | 4 hours | Δ |
| Comparative example 4 | ⓒ | at least 5 hours | 4 hours | × |
| Comparative example 5 | ⊚ | at least 5 hours | 4 hours | Δ |
| Comparative example 6 | ○ | at least 5 hours | at least 5 hours | Δ |
| Comparative example 7 | ○ | 4 hours | 3 hours | Δ |
| Comparative example 8 | × | just after | just after | × |
| Comparative example 9 | × | just after | just after | × |

TABLE 8

| Comparative example | Adhesion | | | Strength of coating film | |
|---|---|---|---|---|---|
| | Original state | Heat resistance | Water resistance | Hardness | Water resistance |
| Comparative example 1 | (a) | (a) | (a) | ○ | ○ |
| Comparative example 2 | (a) | (a) | (a) | ○ | ○ |
| Comparative example 3 | (a) | (d) | (d) | ○ | ○ |
| Comparative example 4 | (a) | (a) | (a) | × | × |
| Comparative example 5 | (b) | (d) | (d) | ○ | ○ |
| Comparative example 6 | (c) | (d) | (d) | ○ | ○ |
| Comparative example 7 | (b) | (d) | (d) | ○ | ○ |
| Comparative example 8 | (a) | (a) | (a) | ○ | ○ |
| Comparative example 9 | (a) | (a) | (a) | ○ | ○ |

The marks used in the above described Tables 5-8 have the following meanings.

Adhesion test
(a): 100/100
(b): 30/100
(c): 15/100
(d): 0/100

REFERENCE EXAMPLES 19-28

(Production of block copolymers)

Into a reactor equipped with a thermometer, a stirrer and a reflux cooler was charged 230 parts of methyl cellosolve, and while introducing nitrogen gas into the reactor and heating the reaction system at 72° C., a mixed solution consisting of

| | |
|---|---|
| methyl cellosolve: | 100 parts |
| glycidyl methacrylate or N-methylolacrylamide: | A parts |
| hydroxyalkyl (meth)acrylate: | B parts |
| a monomer selected from acrylamide, N-monomethylacrylamide, N,N-dimethylacrylamide, acryloylmorpholine and N-vinylpyrrolidone: | C parts |
| and $+CO(CH_2)_4COO(C_2H_4O)_3(CO(CH_2)_4COOO+_{10}$: | 20 parts | was charged into the reactor in 2 hours, and further a polymerization reaction was effected for 2 hours. Then, a mixed solution consisting of

| | |
|---|---|
| methyl cellosolve: | 285 parts |
| lower alkyl (meth)acrylate: | D parts |
| and (meth)acrylic acid: | E parts | was charged into the reactor in 30 minutes, and further a polymerization reaction was effected at 75° C. for 5 hours. The numerical values of the above described parts of A-E are shown in Table 9 together with the results of the polymerization reactions.

REFERENCE EXAMPLES 29-34

(Production of graft copolymers)

Into a reactor equipped with a thermometer, a stirrer and a reflux cooler was charged 230 parts of methyl cellosolve, and while introducing nitrogen gas into the reactor and heating the reaction system at 85° C., a mixed solution consisting of

| | |
|---|---|
| Perbutyl O: | 2.3 parts |

| | |
|---|---|
| t-butylperoxy methacryloyloxyethyl carbonate used as a radically copolymerizable organic peroxide: | 6.0 parts |
| methyl cellosolve: | 100 parts |
| glycidyl (meth)acrylate or N-methylolacrylamide: | A parts |
| hydroxyalkyl (meth)acrylate: and | B parts |
| a monomer selected from acrylamide, N-monomethylacrylamide, N,N-dimethylacrylamide, acryloylmorpholine and N-vinylpyrrolidone: | C parts | was charged into the reactor in 2 hours, and further a polymerization reaction was effected for 7 hours. Then, the reaction solution was heated up to 110° C., and a mixed solution consisting of

| | |
|---|---|
| methyl cellosolve: | 285 parts |
| lower alkyl (meth)acrylate: and | D parts |
| (meth)acrylic acid: | E parts | was charged into the reactor in 30 minutes, and further a polymerization reaction was effected at 110° C. for 7 hours to produce a graft copolymer. The numerical values of the above described parts of A-E and the results of the polymerization reactions are shown in Table 10.

REFERENCE EXAMPLES 35-38

(Production of random copolymers)

Into a reactor equipped with a thermometer, a stirrer and a reflux cooler was charged 230 parts of methyl cellosolve, and while introducing nitrogen gas into the reactor and heating the reaction system at 85° C., a mixed solution consisting of

| | |
|---|---|
| Perbutyl O: | 2.3 parts |
| methyl cellosolve: | 370 parts |
| glycidyl (meth)acrylate or N-methylolacrylamide: | A parts |
| hydroxyalkyl (meth)acrylate: | B parts |
| a monomer selected from acrylamide, N-monomethylacrylamide, N,N-dimethylacrylamide, acryloylmorpholine and N-vinylpyrrolidone: | C parts |
| lower alkyl (meth)acrylate: and | D parts |
| (meth)acrylic acid: | E parts | was charged into the reactor in 3 hours, and further a polymerization reaction was effected for 7 hours. The numerical values of the above described parts of A-E and the results of the polymerization reactions are shown in Table 10.

TABLE 9

| Reference example | | 19 | 20 | 21 | 22 | 23 | 24 | 25 | 26 | 27 | 28 |
|---|---|---|---|---|---|---|---|---|---|---|---|
| A | (1) | 6 | — | — | 9 | 18 | — | 12 | — | 9 | 30 |
|  | (2) | — | 12 | 25 | — | — | 6 | — | 25 | — | — |
| B | (3) | 90 | — | — | 78 | — | — | 66 | — | — | 60 |
|  | (4) | — | 66 | — | — | 55 | — | — | 43 | — | — |
|  | (5) | — | — | 43 | — | — | 90 | — | — | 78 | — |
| C | (6) | 4 | — | — | — | — | 4 | — | — | — | — |
|  | (7) | — | 22 | — | — | — | — | 22 | — | — | — |
|  | (8) | — | — | 32 | — | — | — | — | 32 | — | — |

TABLE 9-continued

| Reference example | | 19 | 20 | 21 | 22 | 23 | 24 | 25 | 26 | 27 | 28 |
|---|---|---|---|---|---|---|---|---|---|---|---|
|  | (9) | — | — | — | 13 | — | — | — | — | 13 | — |
|  | (10) | — | — | — | — | 27 | — | — | — | — | 10 |
| D | (11) | 85 | — | — | 76 | — | — | 67 | — | — | 40 |
|  | (12) | — | 67 | — | — | 60 | — | — | 50 | — | — |
|  | (13) | — | — | 50 | — | — | 85 | — | — | 76 | — |
| E | (14) | 15 | — | 50 | — | 40 | — | 33 | — | 24 | — |
|  | (15) | — | 33 | — | 24 | — | 15 | — | 50 | — | 60 |
| Solid content* | | 26 | 26 | 26 | 26 | 26 | 26 | 26 | 26 | 26 | 26 |
| Viscosity** | | 6 | 6 | 7 | 7 | 5 | 5 | 4.5 | 9 | 3.5 | 7 |

TABLE 10

| Reference example | | 29 | 30 | 31 | 32 | 33 | 34 | 35 | 36 | 37 | 38 |
|---|---|---|---|---|---|---|---|---|---|---|---|
| A | (1) | 18 | — | 12 | — | 9 | — | 6 | — | 12 | — |
|  | (2) | — | 6 | — | 25 | — | 6 | — | 12 | — | 25 |
| B | (3) | — | — | 66 | — | — | 14 | 90 | — | 66 | — |
|  | (4) | 55 | — | — | 43 | — | — | — | 66 | — | 43 |
|  | (5) | — | 90 | — | — | 78 | — | — | — | — | — |
| C | (6) | 27 | — | — | — | — | 80 | 4 | — | — | — |
|  | (7) | — | 4 | — | — | — | — | — | 22 | — | — |
|  | (8) | — | — | 22 | — | — | — | — | — | 22 | — |
|  | (9) | — | — | — | 32 | — | — | — | — | — | 32 |
|  | (10) | — | — | — | — | 13 | — | — | — | — | — |
| D | (11) | — | — | 67 | — | — | 85 | 85 | — | 67 | — |
|  | (12) | 60 | — | — | 50 | — | — | — | 67 | — | 50 |
|  | (13) | — | 85 | — | — | 76 | — | — | — | — | — |
| E | (14) | 40 | — | 33 | — | 24 | — | 15 | — | 33 | — |
|  | (15) | — | 15 | — | 50 | — | 15 | — | 33 | — | 50 |
| Solid content* | | 25 | 25 | 25 | 25 | 25 | 25 | 25 | 25 | 25 | 25 |
| Viscosity** | | 5 | 4.5 | 4 | 3 | 6 | 6 | 4 | 4 | 3.5 | 3 |

The marks used in the above described Tables 9 and 10 have the following meanings.
(1): glycidyl (meth)acrylate
(2): N-methylolacrylamide
(3): 2-hydroxyethyl methacrylate
(4): 2-hydroxyethyl acrylate
(5): 2-hydroxypropyl methacrylate
(6): acrylamide
(7): N-monomethylacrylamide
(8): N,N-dimethylacrylamide
(9): N-acryloylmorpholine
(10): N-vinylpyrrolidone
(11): methyl methacrylate
(12): ethyl acrylate
(13): ethyl methacrylate
(14): methacrylic acid
(15): acrylic acid
*: solid content (% by weight)
**: viscosity (P) at 25° C.

EXAMPLES 12-30 AND COMPARATIVE EXAMPLES 10-19

A polymer produced in Reference examples 19-38 was compounded with a surfactant shown in Tables 11-13, and the resulting coating composition was applied on a polyester film (trademark: Polyethylene Terephthalate Film E-5101, sold by Toyo Boseki Co., Ltd.), and the applied composition was heated and cured under a condition shown in Tables 11-13. The resulting coating film formed on the polyester film was subjected to various tests shown in Tables 14-16.

TABLE 11

| Example | Polymer (parts) | Surfactant (parts) | | Heating condition for film formation |
|---|---|---|---|---|
| Example 12 | Reference example 19, 100 | (a) | 7.0 | 150° C., 2 min. |
| Example 13 | Reference example 20, 100 | (b) (g) | 10.0 1.0 | 130° C., 2 min. |
| Example 14 | Reference example 21, 100 | (c) (g) | 6.0 1.0 | 130° C., 2 min. |
| Example 15 | Reference example 22, 100 | (d) | 8.0 | 150° C., 2 min. |
| Example 16 | Reference example 23, 100 | (e) | 4.0 | 150° C., 2 min. |
| Example 17 | Reference example 24, 100 | (f) (g) | 7.0 1.0 | 120° C., 3 min. |
| Example 18 | Reference example 25, 100 | (a) | 10.0 | 170° C., 1 min. |
| Example 19 | Reference example 26, 100 | (b) (g) | 10.0 1.0 | 150° C., 1 min. |
| Example 20 | Reference example 27, 100 | (c) | 5.0 | 190° C., 30 sec. |
| Example 21 | Reference example 28, 100 | (d) | 5.0 | 160° C., 1 min. |

TABLE 12

| Example | Polymer (parts) | Surfactant (parts) | | Heating condition for film formation |
|---|---|---|---|---|
| Example 22 | Reference example 30, 100 | (e) (g) | 5.0 1.0 | 140° C., 1 min. |
| Example 23 | Reference example 31, 100 | (f) | 5.0 | 150° C., 2 min. |
| Example 24 | Reference example 19, 100 | (e) | 3.0 | 170° C., 1 min. |
| Example 25 | Reference example 20, 100 | (d) (g) | 3.0 1.0 | 140° C., 1 min. |
| Example 26 | Reference example 21, 100 | (c) (g) | 15.0 1.0 | 150° C., 1 min. |
| Example 27 | Reference example 32, 100 | (h) (g) | 12.0 1.0 | 120° C., 3 min. |
| Example 28 | Reference example 23, 100 | (k) | 8.0 | 170° C., 1 min. |
| Example 29 | Reference example 32, 100 | (b) (j) | 2.0 9.0 | 130° C., 2 min. |
| Example 30 | Reference example 33, 100 | (d) (i) | 1.0 10.0 | 150° C., 2 min. |

TABLE 13

| Comparative example | Polymer (parts) | Surfactant (parts) | | Heating condition for film formation |
|---|---|---|---|---|
| Comparative example 10 | Reference example 28, 100 | (d) | 7.0 | 150° C., 2 min. |
| Comparative example 11 | Reference example 34, 100 | (b) (g) | 3.0 1.0 | 130° C., 2 min. |
| Comparative example 12 | Reference example 35, 100 | (a) | 7.0 | 150° C., 2 min. |
| Comparative example 13 | Reference example 36, 100 | (b) (g) | 10.0 1.0 | 130° C., 2 min. |
| Comparative example 14 | Reference example 37, 100 | (e) | 3.0 | 170° C., 1 min. |
| Comparative example 15 | Reference example 38, 100 | (h) (g) | 12.0 1.0 | 120° C., 3 min. |
| Comparative example 16 | Reference example 28, 100 | (f) | 7.0 | 170° C., 1 min. |
| Comparative example 17 | Reference example 34, 100 | (c) (g) | 6.0 1.0 | 120° C., 3 min. |
| Comparative example 18 | Reference example 33, 100 | — | | 170° C., 1 min. |
| Comparative example 19 | Reference example 35, 100 | — | | 150° C., 2 min. |

The marks of the surfactants used in the above described Tables 11-13 have the following meanings.
(a): Nonion S-4
(b): Nonion NS-212
(c): Newrex R
(d): Rapisol B-80
(de): Cation AB
(f): Anon BF
(g): p-toluenesulfonic acid
(h): polyoxyethylene-polyoxypropylene condensate (trademark: Pluronic F-68, sold by Asahi Denka Kōgyō Co., Ltd.)
(i): polyoxyethylene nonylphenyl ether (trademark: Noigen EA-120, sold by Dai-ichi Kōgyō Seiyaku Co., Ltd.)
(j): dialkyl sulfosuccinate (trademark: Neocol SW, sold by Dai-ichi Kōgyō Seiyaku Co., Ltd.)
(k): stearyl betaine (trademark: Bistar MS, sold by Matsumoto Yushi Co., Ltd.)

TABLE 14

| | Anti-fogging property in original state | | Durability of anti-fogging property | Water-resistance of anti-fogging property (4) | | | Adhesion of coating film | Strength of coating film |
|---|---|---|---|---|---|---|---|---|
| Example | (1) | (2) | (3) | (5) | (6) | (7) | (8) | (9) |
| Example 12 | ⊚ | ⊚ | >5 | ⊚ | ⊚ | ○ | ⊚ | ⊚ |
| Example 13 | ⊚ | ⊚ | >5 | ⊚ | ⊚ | ⊚ | ⊚ | ⊚ |
| Example 14 | ⊚ | ⊚ | >5 | ⊚ | ⊚ | ○ | ⊚ | ⊚ |
| Example 15 | ⊚ | ⊚ | >5 | ⊚ | ⊚ | ⊚ | ⊚ | ⊚ |

TABLE 14-continued

| Example | Anti-fogging property in original state (1) | (2) | Durability of anti-fogging property (3) | Water-resistance of anti-fogging property (4) (5) | (6) | (7) | Adhesion of coating film (8) | Strength of coating film (9) |
|---|---|---|---|---|---|---|---|---|
| Example 16 | ⊚ | ⊚ | 4 | ⊚ | ⊚ | ○ | ⊚ | ⊚ |
| Example 17 | ⊚ | ⊚ | 4 | ⊚ | ⊚ | ○ | ⊚ | ⊚ |
| Example 18 | ⊚ | ⊚ | 4 | ⊚ | ○ | ○ | ⊚ | ⊚ |
| Example 19 | ⊚ | ⊚ | >5 | ⊚ | ⊚ | ⊚ | ⊚ | ○ |
| Example 20 | ⊚ | ⊚ | 3 | ⊚ | ○ | ○ | ⊚ | ⊚ |
| Example 21 | ⊚ | ⊚ | >5 | ⊚ | ⊚ | ⊚ | ⊚ | ⊚ |

TABLE 15

| Example | Anti-fogging property in original state (1) | (2) | Durability of anti-fogging property (3) | Water-resistance of anti-fogging property (4) (5) | (6) | (7) | Adhesion of coating film (8) | Strength of coating film (9) |
|---|---|---|---|---|---|---|---|---|
| Example 22 | ⊚ | ⊚ | >5 | ⊚ | ⊚ | ○ | ⊚ | ⊚ |
| Example 23 | ⊚ | ⊚ | 4 | ⊚ | ⊚ | ○ | ⊚ | ⊚ |
| Example 24 | ⊚ | ⊚ | 5 | ⊚ | ⊚ | ○ | ⊚ | ⊚ |
| Example 25 | ⊚ | ⊚ | 5 | ⊚ | ⊚ | ○ | ⊚ | ⊚ |
| Example 26 | ⊚ | ⊚ | 5 | ⊚ | ⊚ | ○ | ⊚ | ⊚ |
| Example 27 | ⊚ | ⊚ | 3 | ⊚ | ○ | ○ | ⊚ | ⊚ |
| Example 28 | ⊚ | ⊚ | >5 | ⊚ | ⊚ | ○ | ⊚ | ⊚ |
| Example 29 | ⊚ | ⊚ | 5 | ⊚ | ○ | ○ | ⊚ | ⊚ |
| Example 30 | ⊚ | ⊚ | >5 | ⊚ | ⊚ | ⊚ | ⊚ | ⊚ |

TABLE 16

| Comparative example | Anti-fogging property in original state (1) | (2) | Durability of anti-fogging property (3) | Water-resistance of anti-fogging property (4) (5) | (6) | (7) | Adhesion of coating film (8) | Strength of coating film (9) |
|---|---|---|---|---|---|---|---|---|
| Comparative example 10 | ⊚ | ⊚ | <1 | ○ | × | × | ⊚ | ⊚ |
| Comparative example 11 | ⊚ | ⊚ | >5 | ⊚ | ⊚ | ⊚ | △ | × |
| Comparative example 12 | ○ | ○ | <1 | ○ | △ | × | × | × |
| Comparative example 13 | ○ | ○ | <1 | ○ | △ | × | × | × |
| Comparative example 14 | ○ | △ | instantaneous | × | × | × | ⊚ | × |
| Comparative example 15 | △ | × | instantaneous | × | × | × | ⊚ | △ |
| Comparative example 16 | ⊚ | ⊚ | <1 | ○ | × | × | ⊚ | ⊚ |
| Comparative example 17 | ⊚ | ⊚ | >5 | ⊚ | ⊚ | ⊚ | × | × |
| Comparative example 18 | ⊚ | ⊚ | 3 | ○ | △ | × | ⊚ | ⊚ |
| Comparative example 19 | × | × | instantaneous | × | × | × | × | × |

The marks used in the above described Tables 14–16 have the following meanings.

(1): A coating film formed in a constant temperature room kept at 20° C. was breathed upon, and the wetted state of the coating film was observed and judged by the naked eye.

(2): A coating film formed in a constant temperature room kept at 20° C. was horizontally arranged above warm water, kept at 60° C., so as to be exposed to the vapor of the warm water, and after the coating film was left to stand for 1 minute, the wetted state of the film was observed and judged by the naked eye.

(3): A coating film formed in a constant temperature room kept at 20° C. was perpendicularly arranged under a tightly closed state on warm water, kept at 60° C., so as to be exposed to the vapor of the warm water, and the durability of the anti-fogging property of the coating film was judged by a lapse of time until the film began to be fogged.

(4): A coating film formed in a constant temperature room kept at 20° C. was immersed in water kept at 30° C. for predetermined times, taken out from the water every predetermined times, and air-dried, and then after the coating film was breathed upon, the fogged state of the film was observed and judged by the naked eye.

(5): after 1 hour
(6): after 3 hours
(7): after 10 hours (8): The surface of a coating film formed in a constant temperature room kept at 20° C. was crosscut by means of a cutter knife, a cellophane tape (sold by Nichiban Co., Ltd.) was stuck to the crosscut coating film, the crosscut film was peeled off from the matrix in a direction perpendicular to that of the adhering interface between the crosscut film and the matrix, and the peeled state of the crosscut film from the matrix was observed and judged by the naked eye.

(9): After coating film formed in a constant temperature room kept at 20° C. was immersed in water kept at 30° C. for 10 hours, the coating film was taken out from the water and rubbed with a finger, and the cracked state and the peeled state of the film from the substrate were observed and judged by the naked eye.

The estimation and judging standard of the performance of the coating film is as follows.

⊚: utterly nothing unusual
○: substantially nothing unusual
Δ: somewhat poor
X: utterly poor
Instantaneous: A coating film begins to be fogged simultaneously with the starting of the judging operation.

As described above, it has been proved that the anti-fogging resin film-forming composition of the present invention can form a coating film having high durability of anti-fogging property, high strength and high adhesion in well-balanced state. On the contrary, a coating composition using a block or graft copolymer having a composition outside the range specifically limited in the present invention or using a random copolymer is poor in any one of the above described 3 properties, and is unsatisfactory in the performance as an anti-fogging resin film-forming composition.

What is claimed is:

1. An anti-fogging curable resin film-forming composition for polycarbonate resin, comprising:
   (A) at least one block copolymer or graft copolymer, each copolymer consisting of (1) 50-95 parts by weight of a hydrophilic polymer segment and (2) 50-5 parts by weight of a hydrophobic polymer segment,
      (a) said hydrophilic polymer segment being formed of
         (i) 1-40% by weight of at least one N-substituted or non-substituted (meth)acrylamide compound represented by the following formulae (I) or (II),
         formula (I) being $CH_2=CR_1CONR_2R_3$ wherein $R_1$ and $R_2$ represent hydrogen atoms or methyl groups; and $R_3$ represents hydrogen atom, methyl group, ethyl group, n-propyl group, isopropyl group, N,N-dimethylaminopropyl group or $-C(CH_3)_2CH_2COCH_3$, and
         formula (II) being $CH_2=CR_1CONA$ wherein $R_1$ represents hydrogen atom or methyl group; and A represents $-(CH_2)_n-$, wherein n is a positive integer of 4 or 5, or $-(CH_2)_2-O-(CH_2)_2-$;
         (ii) 1-20% by weight of at least one monomer having a cross-linkable functional group and being any one of glycidyl (meth)acrylate, N-methylol (meth)acrylate, N-methoxymethylol (meth)acrylamide, and N-butoxymethylol (meth)acrylamide; and
         (iii) 40-98% by weight of at least one hydrophilic monomer copolymerizable with (meth)acrylamide compound (i) and monomer having a cross-linkable functional group (ii); and
      (b) said hydrophobic polymer segment being formed of
         (i) 1-40% by weight of (meth)acrylic acid and
         (ii) 60-99% by weight of at least one hydrophobic monomer copolymerizable with (meth)acrylic acid and
   (B) 0.1-20 parts by weight of a surfactant per 100 parts by weight of said block or graft copolymer, said surfactant having an affinity for said hydrophilic polymer segment of said block or graft copolymer and capable of being gradually bled out on the surface of said anti-fogging curable resin film from the interior thereof.

2. An anti-fogging curable resin film-forming composition for polyester film, comprising
   (A) at least one block copolymer or graft copolymer having a hydrophilic polymer segment and a hydrophobic polymer segment, the weight ratio of the hydrophilic polymer segment to the hydrophobic polymer segment being within the range of 1/9-9/1,
      (a) said hydrophilic polymer segment formed of
         (i) 6-25% by weight of glycidyl (meth)acrylate or N-methylolacrylamide,
         (ii) 43-90% by weight of hydroxyalkyl (meth)acrylate, and
         (iii) 4-32% by weight of a monomer selected from the group consisting of acrylamide, N-monomethylacrylamide, N,N-dimethylacrylamide, N-acryloylmorpholine, and N-vinylpyrrolidone, and
      (b) said hydrophobic polymer segment formed of
         (i) 50-85% by weight of lower alkyl (meth)acrylate and
         (ii) 15-50% by weight of (meth)acrylic acid and
   (B) 0.1-20 parts by weight of a surfactant per 100 parts by weight of said block or graft copolymer, said surfactant having an affinity for said hydrophilic polymer segment of said block or graft copolymer and capable of being gradually bled out on the surface of said anti-fogging curable resin film from the interior thereof.

3. An anti-fogging resin film-forming composition according to claim 1, wherein said surfactant is nonionic surfactant or anionic surfactant.

4. An anti-fogging resin film-forming composition according to claim 1, wherein said surfactant is a combination of nonionic surfactant and anionic surfactant.

5. An anti-fogging resin film-forming composition according to claim 1, which contains 0.1-10 parts by weight of the surfactant based on 100 parts by weight of the copolymer.

6. An anti-fogging resin film-forming composition according to claim 2, wherein said surfactant is a nonionic surfactant or anionic surfactant.

7. An anti-fogging resin film-forming composition according to claim 2, wherein said surfactant is a combination of nonionic surfactant and anionic surfactant.

8. An anti-fogging resin film-forming composition according to claim 2, wherein said surfactant is present in an amount of 0.1-10 parts by weight based on 100 parts by weight of the copolymer.

* * * * *